(12) United States Patent
Gowri et al.

(10) Patent No.: US 8,495,580 B2
(45) Date of Patent: Jul. 23, 2013

(54) FACILITATING USE OF MODEL TRANSFORMATIONS

(75) Inventors: Mangala Gowri, New Delhi (IN); Senthil Mani, Haryana (IN); Saurabh Sinha, New Delhi (IN); Vibha S. Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 12/755,600

(22) Filed: Apr. 7, 2010

(65) Prior Publication Data

US 2011/0252406 A1 Oct. 13, 2011

(51) Int. Cl.
G06F 9/45 (2006.01)

(52) U.S. Cl.
USPC .......................................... 717/126

(58) Field of Classification Search
USPC .......................................... 717/126
See application file for complete search history.

(56) References Cited

U.S. PATENT DOCUMENTS

| | | |
|---|---|---|
| 6,289,502 B1 | 9/2001 | Garland et al. |
| 6,405,361 B1 | 6/2002 | Broy et al. |
| 6,611,947 B1 | 8/2003 | Higgins et al. |
| 6,898,784 B1 | 5/2005 | Kossatchev et al. |
| 6,993,730 B1 | 1/2006 | Higgins et al. |
| 7,137,100 B2 | 11/2006 | Iborra et al. |
| 2003/0074603 A1 | 4/2003 | Bungert et al. |
| 2007/0157169 A1 | 7/2007 | Chen et al. |
| 2007/0179833 A1 | 8/2007 | Moorthy et al. |
| 2009/0113380 A1 | 4/2009 | Ploesser et al. |
| 2009/0150860 A1 | 6/2009 | Gschwind et al. |
| 2009/0217302 A1* | 8/2009 | Grechanik et al. ............ 719/320 |
| 2012/0166373 A1* | 6/2012 | Sweeney et al. ................ 706/14 |

OTHER PUBLICATIONS

Nanda et al., Demystifying Model Transformations . . . , ACM, Oct. 25, 2009, p. 341-360.*
Lorenzoli et al., Automatic Generation of Software . . . , ACM May 10, 2008, p. 501-510.*
Fleurey et al. Qualifying Input Test Data for Model Transformations. Software and Systems Modeling, vol. 8, No. 2 / Apr. 2009, pp. 185-203.
Giese et al. Towards verified model transformations. In Proceedings of the 3rd Workshop on Model Design and Validation (MoDeV2a), pp. 78-93, 2006.
K. Lano et al. Model transformation specification and verification. In QSIC '08: Proceedings of the 2008 The Eighth International Conference on Quality Software, pp. 45-54, Washington, DC, USA, 2008. IEEE Computer Society.

(Continued)

Primary Examiner — John Chavis
(74) Attorney, Agent, or Firm — Ryan, Mason & Lewis, LLP

(57) ABSTRACT

Techniques for facilitating use of a transformer are provided. The techniques include analyzing code of a transformer to compute one or more exception constraints and one or more output constraints, translating the one or more exception constraints and one or more output constraints to state them in terms of one or more input and output meta-model elements, wherein translating the one or more exception constraints and one or more output constraints comprises inferring one or more transformer rules in terms of vocabulary of a meta-model, wherein a transformer rule comprises one of a verification rule and a comprehension rule, and using the one or more inferred transformer rules to facilitate use of a transformer, wherein facilitating use of a transformer comprises supporting model verification and transform comprehension.

20 Claims, 14 Drawing Sheets

OTHER PUBLICATIONS

Narayanan et al. Towards verifying model transformations. Electron. Notes Theor. Comput. Sci., 211:191-200, 2008.

Fleurey. Validation in model-driven engineering: testing model transformations. In Proceedings of the 1st Intl. WorkShop on Model, Design and Validation, pp. 29-40, 2004.

Kuster et al. Validation of model transformations—first experiences using a white box approach. In Proceedings of the 3rd Workshop on Model Design and Validation (MoDeV2a), pp. 62-77. Springer, Oct. 2006.

Baudry et al. Le Traon. Model transformation testing challenges. 2006.

Barnett et al. Verification of object-oriented programs with invariants. Journal of Object Technology, 3:2004, 2004.

Bierhoff et al. Modular typestate checking of aliased objects. In OOPSLA '07: Proceedings of the 22nd annual ACM SIGPLAN conference on Object-oriented programming systems and applications, pp. 301-320, New York, NY, USA, 2007. ACM.

Buse et al. Automatic documentation inference for exceptions. In Proc. of the Intl. Symp. on Softw. Testing and Analysis, pp. 273-281, Jul. 2008.

Flanagan et al. Extended static checking for Java. In Proc. of the ACM SIGPLAN 2002 Conf. on Prog. Lang. Design and Impl., pp. 234-245, Jun. 2002.

Ko et al. Debugging reinvented: asking and answering why and why not questions about program behavior. In ICSE '08: Proceedings of the 30th international conference on Software engineering, pp. 301-310, New York, NY, USA, 2008. ACM.

Nanda et al. Accurate interprocedural nulldereference analysis for Java. In Proceedings of the 31st Intl. Conf. on Softw. Eng., May 2009.

D. Schmidt. Model-driven engineering. In IEEE Computer, 2006.

M. Weiser. Program slicing. IEEE Trans. Softw. Eng., 10(4):352-357, Jul. 1984.

King. Symbolic execution and program testing. Commun. ACM, 19(7):385-394, Jul. 1976.

\* cited by examiner

$\mathcal{E}$ = {DataModel, Artifact, ContextArtifact, EnumArtifact, Attribute, Annotation, ThisPackage}
$\mathcal{R}$ = {C: Contains, I: inheritsFrom}
$\mathcal{P}$ = {name, type, value, multiplicity, isSimple}
$\delta_r$ :  DataModel $\mapsto$ {(C,Artifact, artifacts, many),
(C,ContextArtifact,contextArtifacts,many),
(C,EnumArtifact,enumArtifacts,many)}
Artifact $\mapsto$ {(C,Attribute,attributes,many)}
ContextArtifact $\mapsto$ {(C,Attribute,attributes,many)}
EnumArtifact $\mapsto$ ∅
Attribute $\mapsto$ {(C,Annotation,annotations,many)}
Annotation $\mapsto$ ∅
ThisPackage $\mapsto$ {(I,Annotation,NA)}
$\delta_p$ :  DataModel $\mapsto$ {name}
Artifact $\mapsto$ {name}
ContextArtifact $\mapsto$ {name}
EnumArtifact $\mapsto$ {name}
Attribute $\mapsto$ {name, type, isSimple, multiplicity}
Annotation $\mapsto$ {name,value}
ThisPackage $\mapsto$ (name,value)
$e_r^t$ = DataModel

FIG. 3

$E$ :{ BusinessProcess, Gap : Artifact
GapResolution : ContextArtifact
Priority : EnumArtifact
id, name, gaps, priority, resolution,
rationale : Attribute
current: ThisPackage}

$P$ :{ name= "BusinessProcess", name= "Gap",
name= "GapResolution", name= "Priority", name= "id",
name= "name", name= "description", name= "gaps",
name= "priority", name= "resolution", name= "rationale",
type= "String", type= "Gap", type= "Priority",
type= "GapResolution", name= "current", isSimple= "true",
multiplicity= "1"}

$\delta_r^i$ :

| | |
|---|---|
| BusinessProcess.attributes | ↦ {id, name, gaps} |
| Gap.attributes | ↦ {id, name, priority, resolution} |
| GapResolution.attributes | ↦ {rationale} |
| id.annotations | ↦ ∅ |
| name.annotations | ↦ ∅ |
| gaps.annotations | ↦ {current} |
| priority.annotations | ↦ {current} |
| resolution.annotations | ↦ {current} |
| rationale.annotations | ↦ ∅ |

$\delta_p^i$ :

| | |
|---|---|
| BusinessProcess | ↦ {name= "BusinessProcess"} |
| Gap | ↦ {name= "Gap"} |
| GapResolution | ↦ {name= "GapResolution"} |
| Priority | ↦ {name= "Priority"} |
| id | ↦ {type= "String", isSimple= "true", multiplicity= "1"} |
| name | ↦ {type= "String", isSimple= "true", multiplicity= "1"} |
| gaps | ↦ {type= "Gap", multiplicity= "1"} |
| priority | ↦ {type= "Priority", multiplicity= "1"} |
| resolution | ↦ {type= "GapResolution", multiplicity= "1"} |
| rationale | ↦ {type= "String", isSimple= "true", multiplicity= "1"} |
| current | ↦ {name= "current"} |

$e_r$ = Datamodel

*FIG. 5*

```
    public void execute1( EObject source, EObject target) {
1.    Attribute attr = (Attribute)source;
2.    Property prop = (Property)target;
3.    PrimitiveType ptype = null;
4.    org.eclipse.uml2.uml.Package umlprimitives =
5.        UMLUtilities.loadPackage(URI.createURI(
6.        Constants.UML_LIBRARY)) ;
7.    String type_src = attr.getType () ;
8.    if (attr.isISimple()) {
9.      if (type_src.equals("String"))
10.        ptype = UMLUtilities.findType(umlprimitives, "String");
      }
11.   if (ptype != null)
12.     prop.setType(ptype);
      }
    private void handleComplexType( Class cls, Iterator attrItr ) {
13.   Attribute attr = null;
14.   Property prop = null;
15.   Association assoc = null;
16.   while (attrItr.hasNext()) {
17.     attr = (Attribute) attrItr.next();
18.     if (!attr.isIsSimple()) {
19.       ThisPackage annotation =
20.         (ThisPackage)attr.getAnnotations().get(0);
21.       if (annotation != null) {
22.         prop = UMLUtilities.findProperty(cls, attr.getName())
23.   prop.setType(cls.getType());
      }
    public void execute2( EObject source, EObject target ) {
24.   DataModel sourceModel = (DataModel) source;
25.   Model targetModel = (Model)target;
26.   Iterator artifacts = sourceModel. getArtifacts () ;
27.   while (artifacts.hasNext()) {
28.     Artifact artifact = (Artifact)artifacts.next();
29.     Class cls = UMLUtilities.findClass(artifact.getName());
30.     handleComplexType (cls, artifact.getAttributes()) ;
      ... } }
```
← 502

Examples of potential runtime exceptions:
 1. line 9   null-pointer exception  if type_src is null
 2. line 20  class-cast exception    if the first element in the list returned
                                     by getAnnotations() is not an
                                     instance of ThisPackage
 3. line 20  array-index exception   if getAnnotations() returns
                                     an empty list

← 504

Example of output statement:
 4. line 12 prop.setType   defines an output model element if
                           ptype is not null, and the predicates in
                           lines 8 and 9 evaluate true

$$\gamma ::= \langle v \approx_{ref} \text{null}\rangle \,|\, \quad (1)$$
$$\langle v \approx_{ref} \text{strConst}\rangle \,|\, \quad (2)$$
$$\langle v_1 \approx_{ref} v_2\rangle \,|\, \quad (3)$$
$$\langle v \approx_{ref} \text{true}\rangle \,|\, \quad (4)$$
$$\langle v_1 \approx_{int} v_2\rangle \,|\, \quad (5)$$
$$\langle v \approx_{int} \text{intConst}\rangle \,|\, \quad (6)$$
$$\langle v.size \approx_{int} \text{intConst}\rangle \,|\, \quad *(7)$$
$$\langle type(v) \approx_{type} \mathcal{T} \rangle \quad *(8)$$
$$v ::= v_{ref}.v \,|\, m(v).v \,|\, v_{ref} \,|\, v_{int} \,|\, v_{bool} \,|\, m(v) \quad *(9)$$
$$\approx_{ref} ::= = \,|\, \neq$$
$$\approx_{type} ::= \in \,|\, \ni$$
$$\approx_{int} ::= < \,|\, \leq \,|\, = \,|\, \neq \,|\, > \,|\, \geq$$

FIG. 8

```
                                                                    ┌─ 802
procedure Compute Constraints
input    s         statement to start backward analysis from
         γ         stating predicate at s
output   C_I       constraints on input variables
global   CS        call stack of methods
         σ(s, Γ)   summary information at a call site s that maps an
                   incoming state Γ to an outgoing state
begin
  1. initialize state Γ to {γ}; initialize worklist with (s, Γ)
  2. while worklist ≠ ∅ do
  3.     remove (s, Γ) from worklist
  4.     foreach predecessor s_p of s do
  5.         if s_p is not the entry and not a call then
  6.             compute Γ' for the transformation induced by s_p
  7.             if Γ' is consistent then
  8.                 add (s_p, Γ') to worklist if not visited
  9.         else if s_p is a call that invokes M then
 10.             Γ' = σ(s_p, Γ)
 11.             if Γ' = ∅ then // no summary exists
 12.                 push M onto CS; Γ' = map Γ to the exit of M
 13.                 ComputeConstraints(exit node of M, Γ'); pop CS
 14.                 Γ' = map state at the entry of M to s_p
 15.                 add Γ' to σ(s_p, Γ)
 16.             add (s_p, Γ') to worklist if not visited
 17. if CS = ∅ then // method not being analyzed in a specific context
 18.     if this is the entry method of τ then
 19.         C_I = C_I ∨ Γ // add path constraint to DNF
 20.     else foreach call site s_c that calls this method do
 21.         Γ' = map Γ to s_c ; ComputeConstraints(s_c, Γ')
end
```

FIG. 9

| STATEMENT | STATE TRANSFORMATION |
|---|---|
| (1) x = y | $\Gamma' = \Gamma[x/y]$ |
| (2) x = r.f | $\Gamma' = \Gamma[x/r.f] \cup \{\langle r \neq \text{null}\rangle\}$ |
| (3) if x op y | $\Gamma' = \Gamma \cup \{\langle x\ op\ y\rangle\}$ (true branch) |
|   | $\Gamma' = \Gamma \cup \{\langle \neg(x\ op\ y)\rangle\}$ (false branch) |
| (4) x = y op z | $\Gamma' = \Gamma \setminus \Gamma[x]$ |
| *(5) x = new T | $\Gamma' = \Gamma \cup \{\langle x \neq \text{null}\rangle, \langle type(x) \in \{T\}\rangle\}$ |
| *(6) x = (T)y | $\Gamma' = \Gamma \cup \{\langle type(y) \in subtypes(T)\rangle\}$ |
| *(7) x instanceof T | $\Gamma' = \Gamma \cup \{\langle x \neq \text{null}\rangle,$ |
|   | $\langle type(x) \in subtypes(T)\rangle\}$ |
| *(8) x = r.m() (ext) | $\Gamma' = \Gamma[x/r.m()]$ |
| (9) x = r.m() (app) | $\Gamma' = \sigma(r.m, \Gamma) \cup \{\langle r \neq \text{null}\rangle\}$ |

```
                                                                    ┌ 1002
algorithm TransformerAnalysis
input    τ          transformer
output   C_I(ex)    exception constraints for τ
         C_I(out)   output constraints for τ
global   C_I        set of input constraints
begin
        //Identify exception constraints for null-pointer exceptions
   1.   foreach statement s that dereferences v do
   2.       γ = <v = null>; C_I = ∅
   3.       analyzeMethod(s, {γ}); add C_I to C_I(ex)
        //Identify exception constraints for class-cast exceptions
   4.   foreach typecast statement s : x = (T)y do
   5.       γ = <type(x) ∋ (subtypes(T) ∪ {null})>; C_I = ∅
   6.       analyzeMethod(s, {γ}); add C_I to C_I(ex)
        //Identify exception constraints for array-index exceptions
   7.   foreach get statement s : c.get(intConst) do
   8.       γ = <c ≠ null>; C_I = ∅
   9.       analyzeMethod(s, {γ} ∪ {< c.size ≤ intConst >})
  10.       if there is no statement on which s is directly/indirectly control
            dependent and that checks c.size then
  11.           add C_I to C_I(ex)
        //Identify output constraints
  12.   foreach output variable v do
  13.       foreach reaching definition d of v at the exit of τ do
  14.           Let d be control dependent on (s_cd, L)
  15.           Let γ be the predicate asserting that the condition at s_cd
                evaluates to L (true or false)
  16.           analyzeMethod(s_cd, {γ}); add C_I to C_I(out)
        //post-process
  17.   remove non-input-variable predicates from I(ex) and C_I(out)
end
```

| | EXCEPTION CONSTRAINT | TRANSFORM RULE |
|---|---|---|
| 1. | (source.isIsSimple() = true) ∧ (source.getType () = null) | (DataModel.artifacts.attributes.isSimple = true) ∧ (DataModel.artifacts.attributes.type = null) <br> ⇒ NPE <br> (DataModel.contextArtifacts.attributes.isSimple = true) ∧ (DataModel.contextArtifacts.attributes.type = null) <br> ⇒ NPE |
| 2. | (source.getArtifacts()*.getAttributes()*.isIsSimple() ≠ true) ∧ (type(source.getArtifacts()*.getAttributes()*.getAnnotations().get(0)) ∋ {ThisPackage}) | (DataModel.artifacts.attributes.isSimple ≠ true) ∧ (type(Datamodel.artifacts.attributes.annotations 0) ∋ {ThisPackage}) <br> ⇒ CCE |
| 3. | (source.getArtifacts()*.getAttributes()*.isIsSimple() ≠ true) ∧ (source.getArtifacts()*.getAttributes()*.getAnnotations().size ≤ 0) | (DataModel.artifacts.attributes.isSimple ≠ true) ∧ (Datamodel.artifacts.attributes.annotations.size ≤ 0) <br> ⇒ AIE |
| | OUTPUT CONSTRAINT | TRANSFORM RULE |
| 4. | (source.isIsSimple() = true) ∧ (source.getType().equals("String") = true) | (DataModel.artifacts.attributes.isSimple = true) ∧ (DataModel.artifacts.attributes.type = "String") <br> ⇒ ∃ Model.classes.properties.type <br> (DataModel.contextArtifacts.attributes.isSimple = true) ∧ (DataModel.contextArtifacts.attributes.type = "String") <br> ⇒ ∃ Model.classes.properties.type |

FIG. 12

```
[RULEPREDICATE]
    ψ      ::= [π_model ≈_ref null] |
               [π_model ≈_ref strConst] |
1202 →         [π_model ≈_ref true] |
               [π_model.size ≈_int intConst] |
               [π_model ≈_type T] |                    T ⊆ ε
    ≈_ref  ::= = | ≠
    ≈_int  ::= < | ≤ | = | ≠ | > | ≥
    ≈_type ::= ∈ | ∋

[TRANSFORMRULE]
    Ψ      ::= ψ_1 ∧ ... ∧ ψ_k ⟹ result              k ≥ 1
1204 → result ::= excp | ∃(π_model)
    excp   ::= NPE | CCE | AIE
```

```
<mapping>
    <metaModelElement name="isSimple">
        <method name="isIsSimple"/>
    </meta-model-element>
    <metaModelElement name="type">
        <method name="getType"/>
        <method name="setType"/>
    </meta-model-element>
    <metaModelElement name="artifacts">
        <method name="getArtifacts"/>
        <method name="setArtifacts"/>
    </meta-model-element>
    <metaModelElement name="attributes">
        <method name="getAttributes"/>
        <method name="setAttributes"/>
    </meta-model-element>
    <metaModelElement name="annotations">
        <method name="getAnnotations"/>
        <method name="setAnnotations"/>
    </meta-model-element>

<methodName name="execute1()"/>
        <source name="DataModel.artifacts.attributes"/>
        <target name="Model.Class.Property"/>
    </methodName>
    <methodName name="execute1()"/>
        <source name="DatatModel.contextArtifacts.attributes"/>
        <target name="Model.Class.Property"/>
    </methodName>
    <methodName name="execute2()"/>
        <source name="DataModel"/>
        <target name="Model"/>
    </methodName>
</mapping>
```

FACILITATING USE OF MODEL TRANSFORMATIONS

FIELD OF THE INVENTION

Embodiments of the invention generally relate to information technology, and, more particularly, to model-driven development.

BACKGROUND OF THE INVENTION

Model driven development (MDD) is used today to develop enterprise applications. MDD involves capturing stakeholder input as a structured model and transforming the input model to various low level models (at a lower level of abstraction) and then finally code. Transformations can be done manually or automatically, and there is an increasing practice of pre-creating transformers which non-developers can use.

Transformer users, however, can run into issues when using a transformation and they often do not possess the requisite information for solving such issues. For example, the transformation can fail or generate incomplete output because there are some problems in input model. With existing approaches, the only options a user has to solve such problems are to read transformer documentation (if available), look into the transformer code, and/or ship the input model to the author of transformer to help solve the issue.

SUMMARY OF THE INVENTION

Principles and embodiments of the invention provide techniques for facilitating use of model transformations. An exemplary method (which may be computer-implemented) for facilitating use of a transformer, according to one aspect of the invention, can include steps of analyzing code of a transformer to compute one or more exception constraints and one or more output constraints, translating the one or more exception constraints and one or more output constraints to state them in terms of one or more input and output meta-model elements, wherein translating the one or more exception constraints and one or more output constraints comprises inferring one or more transformer rules in terms of vocabulary of a meta-model, wherein a transformer rule comprises one of a verification rule and a comprehension rule, and using the one or more inferred transformer rules to facilitate use of a transformer, wherein facilitating use of a transformer comprises supporting model verification and transform comprehension.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating input meta-model for transformer INFOTRANS, according to an embodiment of the invention;

FIG. 3 is a diagram illustrating an input model for transformer INFOTRANS, according to an embodiment of the invention;

FIG. 5 is a diagram illustrating three methods from the Java transformer code for INFOTRANS, three potential runtime exceptions, and the execution condition for an output statement, according to an embodiment of the invention;

FIG. 7 is a diagram illustrating abstract predicates tracked by analysis, according to an embodiment of the invention;

FIG. 8 is a diagram illustrating analysis used to compute constraints on input variables under which the given predicate γ evaluates true at the given statement s, according to an embodiment of the invention;

FIG. 9 is a table illustrating state transformations at statements, according to an embodiment of the invention;

FIG. 10 is a diagram illustrating analysis for computing exception and output constraints for a transformer, according to an embodiment of the invention;

FIG. 11 is a table illustrating exception and output constraints and the corresponding transform rules inferred for the three exceptions and output statement in the INFOTRANS code fragment depicted in FIG. 5, according to an embodiment of the invention;

FIG. 12 is a diagram illustrating rule predicates defined with respect to meta-model access paths and transform rules defined with respect to a pair of input and output meta-models, according to an embodiment of the invention;

FIG. 13 is a diagram illustrating a mapping file used for translating the INFOTRANS exception and output constraints to transform rules, according to an embodiment of the invention;

DETAILED DESCRIPTION

Figure 1:
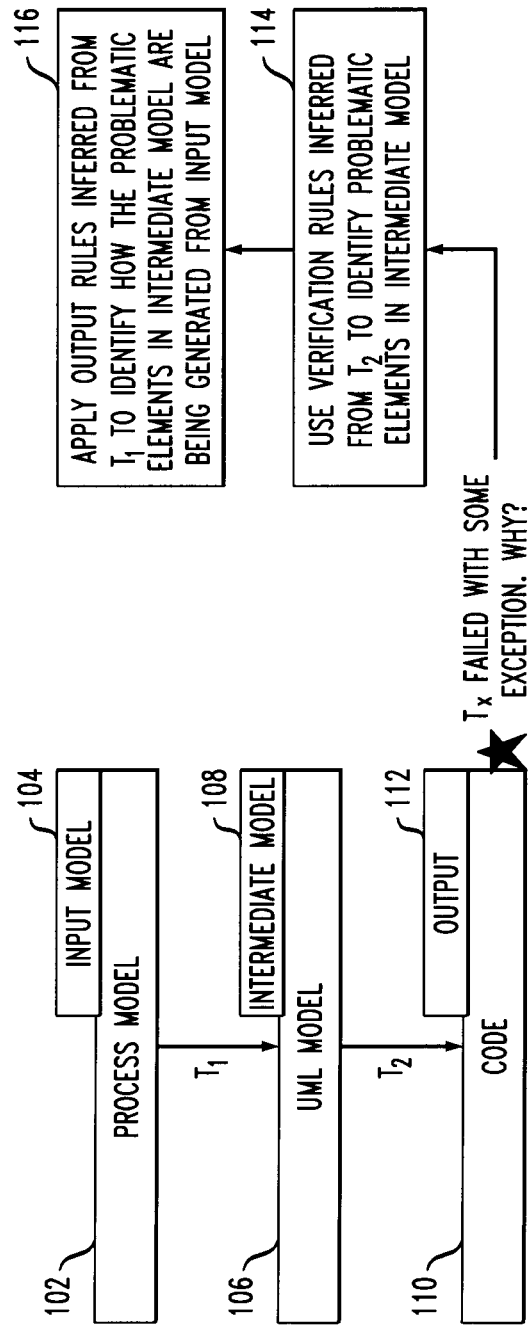
FIG. 1 is a diagram illustrating an example usage scenario for debugging model transformer chains, according to an embodiment of the invention.

Principles of the invention include comprehension of model transformers. One or more embodiments of the invention include providing an approach for assisting users in understanding model transformations and debugging their input models. The techniques described herein include using automated program-analysis techniques to analyze the transformer code and compute information, such as constraints under which a transformation may fail or be incomplete. This information is used to compute rules that can be used to check whether an input model violates transformation constraints, and to support general user queries about a transformation. As detailed herein, one or more embodiments of the invention enables a user to efficiently diagnose a failure or identify the usage conditions of a transformation without examining the transformation source code.

One or more embodiments of the invention include analyzing a transformer Γ and automatically extracting two types of constraints that can be used to explain the output of Γ. The techniques detailed herein can recover constraints on the input model under which an execution of F may fail with an exception. Using this information, a user can identify, without examining the source code of Γ, the input model elements that caused the failure. Also, one or more embodiments of the invention can include extracting constraints on the input model under which an output model element is either generated or has a certain value. This information is useful for explaining to a user the reason why an output model element is generated.

By way of example, for the transformation code, for instance, depicted in FIG. 5, to check for nullness of type src at line 9, one or more embodiments of the invention include generating the following predicates: (source.isIsSimple( )=true) ∧ (source.getType( )=null). Each predicate that is rooted in the source element is of interest as it implies a constraint on the input source model. The techniques detailed herein can additionally include illustrating how these predicates are mapped to the domain model.

Unlike other precondition analyses where an access path is strictly composed of variables and fields, the techniques described herein captures a predicate as a complete access path with functions and variables nested within. For example, a precondition could be as simple as source.getType( )=null and as complex as: source.getContextual Artifacts( ).iterator ( ).next( ).getName( ).equals(source.getArtifacts( ).it erator ( ).next( ).getAttributes( ).iterator( )next( ).getType( ))=true and still be mapped semantically to the input model. In the model-to-model context, rules can be used to construct a model verifier that, given an input model for transformer Γ, checks whether the model violates the constraints of Γ. The verifier can be used, for example, in an interactive mode to guide a user in creating a valid input model, thus ensuring that the transformer nether fails nor generates an unexpected output model. The rules can also be used to build a querying tool, which a user can use to understand transformation semantics. For example, the user can query the tool to identify the input model elements from which an output model element is derived.

As detailed herein, one or more embodiments of the invention can provide automated support for diagnosing the cause of a failure of a transformation and understanding the semantics of a transformation. Thus, the manual effort required to perform such tasks is reduced, which not only makes the process more efficient but also less prone to errors. Also, the techniques described herein are applicable in cases in which the source code of the transformer is not available for examination. This occurs frequently in practice as third-party tools are often used to perform automated model transformation. In such cases, the tool provider (by using a rule-inference approach detailed herein) can add verification and querying capabilities to the tool, and thus improve the usefulness of their tool. Further, one or more embodiments of the invention can be extended to include model-to-code or other model-to-text transformations as well.

One or more embodiments of the invention assume that a transformer is correct, and does not attempt to validate or test it. Transform users are assisted in the task of debugging input model instances, and errors causing a transformation to fail can be identified. FIG. 1 is a diagram illustrating an example usage scenario for debugging model transformer chains, according to an embodiment of the invention. By way of illustration, FIG. 1 depicts a process model 102 (which includes an input model 104), which provides $T_1$ to a uniform modeling language (UML) model 106 (which includes an intermediate model 108), which provides $T_2$ to a code component 110 (which includes an output 112). From code component 110, $T_x$ failed with some exception, and in step 114, one can use verification rules inferred from $T_2$ to identify problematic elements in the intermediate model 108. Also step 116 includes applying output rules inferred from $T_1$ to identify how the problematic elements in the intermediate model 108 are being generated from the input model 104.

In one or more embodiments of the invention, automated program-analysis techniques are used to analyze the transformer code and compute information such as constraints under which a transformation may fail or be incomplete. As detailed herein, this information can be used to compute rules that can be used to check whether an input model violates transformation constraints, and to support general user queries about a transformation.

In one or more embodiments of the invention, a querying tool uses an input model and meta-model, an output meta-model, as well as a rule set (for example, a generated rule set). Typical queries can include, for example, a question regarding why a transformation failed with a particular exception (that is, a transformation failure). A querying tool can provide the matching rule that failed which resulted in the exception and evaluate the rule in the input model to provide the handle to the model element that caused the issue. Using this, an end user can modify the input model to avoid the exception.

Other typical queries can include, for example, a question regarding why an output model element was not generated (that is, incomplete transformation). The querying tool can identify all rules that determine the creation of a specific output model element and identify the input model element that participates in the rule. Using this information, an end user can modify the input model to get the desired output.

To illustrate the techniques described herein, an example application is discussed. The application is referred to as INFOTRANS, and it takes as input a domain-specific information model, converts the model to a database schema, and creates a set of services the let users interact with the data. A domain subject-matter expert provides the input information model using a pre-defined meta-model. INFOTRANS converts the information model to a unified modeling language (UML) class model using a model-to-model transformation framework. The class model is converted, using model-to-text transformations, to create a database-schema definition file and Java classes that implement the data services.

As detailed herein, a meta-model describes the structure or the abstract syntax of a model in terms of the types of elements and relations from which the model may be constructed. A meta-model can be more formally defined as follows:

DEFINITION 1: (Meta-model) A meta-model M is a tuple ($\epsilon$, R, P, $\delta_r$, $\delta_p$, $e_r^r$). $\epsilon = \{e_1^t, \ldots, e_k^t\}$, $k \geq 1$, is a set of element types. $R = \{r_1, \ldots, r_k\}$, $k \geq 1$, is a set of relation types. $P = \{p_1, \ldots, p_k\}$, $k \geq 1$, is a set of properties. $\delta_r: \epsilon \rightarrow (R \times \epsilon, \text{String}, \text{cardinality})$ maps an element type to its related element types, where String represents the name of the related element type; cardinality ('one,' 'many' or 'NA') represents the number of related element types. $\delta_p: \epsilon \rightarrow \rho(P)$ maps an element type to its associated properties. $e_r^r \in \epsilon$ is the unique root element type: $\wedge e^r \in \epsilon: \delta_r(e^r) = (r, e_r^r), \forall r \in R$.

Additionally, examples of commonly used schema languages for defining meta-models can include ECORE, extensible markup language (XML) schema definition (XSD) and meta-object facility (MOF). These languages serve the purpose of specifying the syntax of models, and thus, are analogous to language grammars that define the syntax of programming languages.

FIG. 2 is a diagram illustrating input meta-model 202 for transformer INFOTRANS, according to an embodiment of the invention. FIG. 2 depicts the INFOTRANS input meta-model, defined using ECORE. The meta-model contains seven types of elements and two types of relations: a containment relation and an inheritance relation. Three of the element types, artifact, ContextArtifact, and EnumArtifact, represent information entities. An Artifact is a key enterprise entity that has a lifecycle associated therewith. In the generated UML model, such entities have operations associated with them for creating, deleting, updating, and retrieving all, or particular instances of the entity. A ContextArtifact is an information entity that is available on the Artifact. Operations for creating, updating, or deleting such entities are available on the Artifact which contains this entity. An EnumArtifact stores a predefined list (or, an enumeration) of values from which to select. The generated output model has operations for retrieving the list of values from, adding a value to, or deleting a value from, an EnumArtifact.

An information entity is composed of Attributes, each of which has four properties associated with it: name, multiplicity, isSimpleType and type. The type property can be an element in the meta-model, a simple type (for example, a String), or a type defined in an external model. Each Attribute can contain an Annotation, which is a name-value pair that captures additional information about the attribute. ThisPackage is a special type of Annotation (it inherits from Annotation) that is used to specify that the element referred to in type property is present in the same model instance.

The function $\delta_r$ maps each element type to its relationship with other element types. The result of the mapping is a 4-tuple containing a relation type, an element type, a name, and a cardinality. Except for the relationship between Annotation and ThisPackage, all other relationships are containment relations. Similarly, $\delta_p$ maps each element type to the properties associated with the element.

Additionally, the definition for a meta-model access path can include the following:

DEFINITION 2: (Meta-model access path) Let $(\epsilon, R, P, \delta_p, e_r^t)$ be a meta-model. Let $\Pi$ be a sequence $e_1.e_2.\ldots.e_k$, a sequence $e_1.e_2.\ldots.e_k.p$, or a sequence $e_1.e_2.\ldots.e_k.c$, $k \geq 1$, such that (1) $e_i \in \epsilon$, (2) $e_1 = e_r^t$, (3) for $k \geq 2$, $\delta_r(e_{k-1}) = (r_k, e_k, n_k, c_k)$, where $r_k$ is a containment relation, (4) $p = \delta_p(e_k)$, and (5) c is an integer constant, such that $e_k$ has cardinality 'many.' A meta-model access path $\Pi_{model}$ is formed by replacing each $e_i$, $2 \leq i \leq k$, with $n_i$ in $\Pi$.

Thus, a meta-model access path is a sequence of containment relations that starts at the root element type and ends at either an element type or a property type (that is associated with the preceding element type). For example, in the input meta-model for INFOTRANS, Data-Model.contextArtifacts.attributes is an access path that ends at an element type, whereas DataModel.artifacts.attributes.is—Simple is an access path that ends at a property type.

Given a meta-model M, a model can be constructed by creating instances of the element types, relations, and properties specified in M. A model constructed from a meta-model can be defined as follows:

DEFINITION 3: (Model) A model M constructed from a meta-model $M = (\epsilon, R, P, \delta_r, \delta_p, e_r^t)$ is a tuple $(E, P, \delta_r^i, \delta_p^i, e_r)$. $E = \{e_1, \ldots, e_k\}$, $k \geq 1$, is a set of elements such that each $e \in E$ is an instance of an element type $e^t \in \epsilon$. P is a set of property instances (p, val), where $p \in P$ and val is a value assigned to property p. $\delta_r^i: E \rightarrow (R \times E)$ maps a model element to its related elements. $\delta_p^i: E \rightarrow \rho(P)$ maps a model element to its associated property instances. $e_r \in E$ is the unique root element of the model.

FIG. 3 is a diagram illustrating an input model (an instance of the meta-model shown in FIG. 2) 302 for transformer INFOTRANS, according to an embodiment of the invention. FIG. 3 depicts an information model for the requirements-gathering activity in an enterprise process transformation project. The enterprise analyst identifies the focal business processes (BusinessProcess). For each business process, a set of gaps (Gap) between the as-is and to-be process are identified. For each gap, a solution for bridging the gap (GapResolution) is identified and a priority (priority) is assigned thereto. Because a GapResolution exists in context of a Gap, it is defined as a ContextArtifact type. An attribute priority stores pre-defined priority values (such as, high, medium, low). Therefore, its type is an enumeration type.

For the INFOTRANS application, the input ECORE model is converted to a UML class model using a transformer. Instead of presenting an output UML model and meta-model, it can be illustrated how the INFOTRANS transformer generates output model elements from input model elements.

Figure 4:
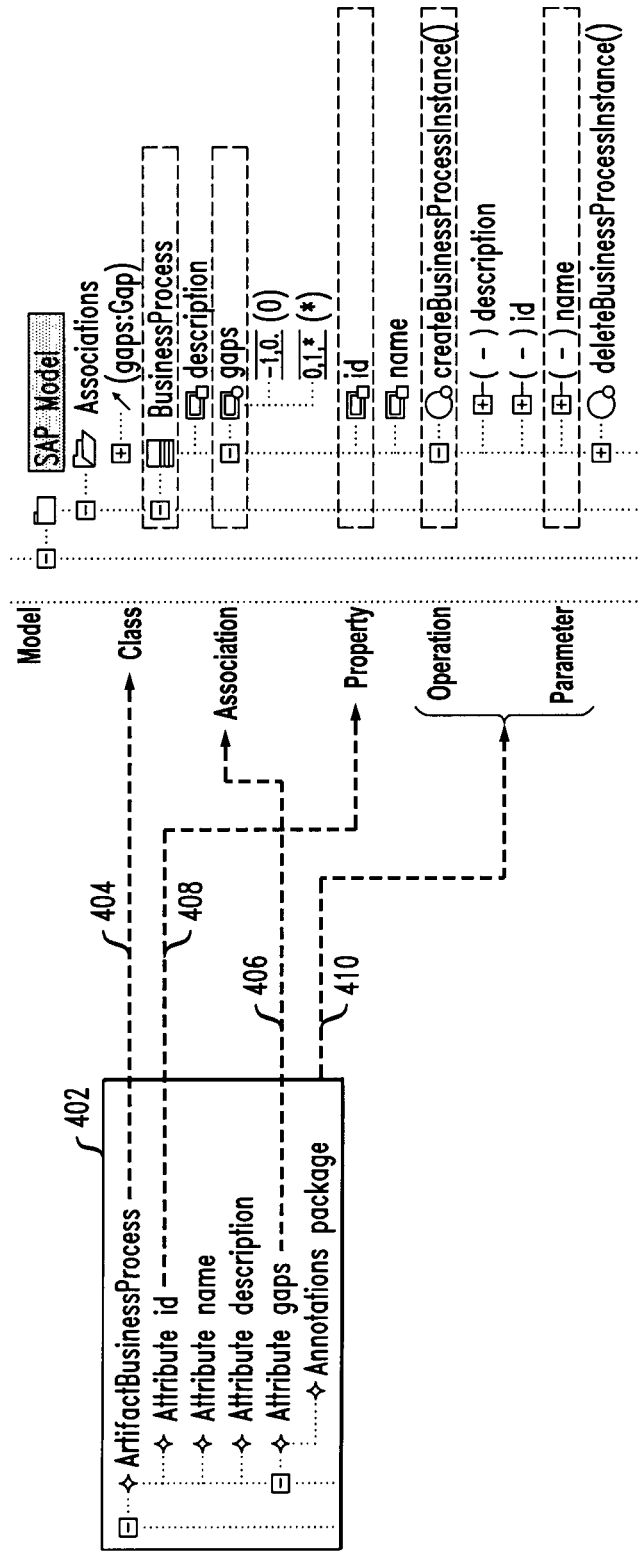
FIG. 4 is a diagram illustrating a mapping of input model elements to output model elements, according to an embodiment of the invention.

FIG. 4 is a diagram illustrating a mapping of input model elements to output model elements (for example, created by the transformer for INFOTRANS), according to an embodiment of the invention. By way of illustration, FIG. 4 depicts a transform component 402. Additionally, in step 404, for each artifact, a UML class is generated. In step 406, for each attribute with simplyType=false, an association is generated. In step 408, for each attribute with simpleType=true, a UML property is generated. Also, in step 410, for each artifact, a set of operators and parameters are generated in the output class.

FIG. 4 depicts the input-to-output mappings for some of the model elements. By way of example, for each Artifact in the input model, the transformer creates a Class, with a set of operations and parameters, in the output model.

A transformer takes as input a model conforming to a given meta-model and produces an output model conforming to another meta-model or a text-based artifact such as code. Transformers can be written in general-purpose programming languages (for example, Java) or scripting languages (for example, XSLT). A model-to-model transformer can further be defined, for example, as follows:

DEFINITION 4: (Model-to-model transformer) A model-to-model transformer r: $M_I \rightarrow M_O$ is a program that given an input model MI (an instance of meta-model $M_I$) generates an output model MO (an instance of meta-model $M_O$).

FIG. 5 is a diagram illustrating three methods from the Java transformer code for INFOTRANS 502, three potential runtime exceptions 504, and the execution condition for an output statement 506, according to an embodiment of the invention.

The execute1( ) method is used to convert an Attribute instance in the input model to an instance of Property in the output model. If the is Simple property of Attribute is set to true (line 8) and the value of type property of Attribute is String (line 9), the method searches for the corresponding UML type (line 10) and sets the type for Property in output model (line 12).

Function execute2( ) is invoked during the course of transformation to create operations and associations for all elements of type Artifact. It takes as arguments the input and output model instances. It iterates over all the Artifacts and invokes handleComplexType( ) for each instance, passing the list of contained attributes and corresponding output class as arguments. The output Class instance is created by a method that transforms each Artifact/ContextArtifact/EnumArtifact element in the input model to a Class in output model. handleComplexType( ) in turn, converts all input model attribute elements whose property isSimple is set to false to associations in the output model. handleComplexType( ) iterates over each attribute (line 16), checks if a ThisPackage annotation is available on the Attribute (line 21), and then creates the association.

FIG. 5 also lists three potential exceptions that can occur during the execution of the transformer. If, in the input model, an Attribute instance does not have a type property, attr.getType( ) returns null at line 7, which causes a null-pointer exception at the dereference of type src at line 9. An arrayindex exception occurs on line 20 if, in the input model, an Attribute instance whose isSimple property is true has no Annotation instances contained within it. At the same line, a class-cast exception occurs if the first Annotation instance in Attribute is not an instance of input meta-model element type ThisPackage. One or more embodiments of the invention can include inferring such constraints on input model elements under which the transformer can fail with an exception. The constraints can enable a user to diagnose efficiently the cause of the failure (that is, invalid input model elements) without having to examine the source code.

FIG. 5 also illustrates an example of conditions on output statements. Statement 12 defines an output model element. It is reached if, in the input model, an Attribute instance has property isSimple set to true and property type set to "String." One or more embodiments of the invention can include inferring such constraints under which an output model element is generated.

Figure 6:
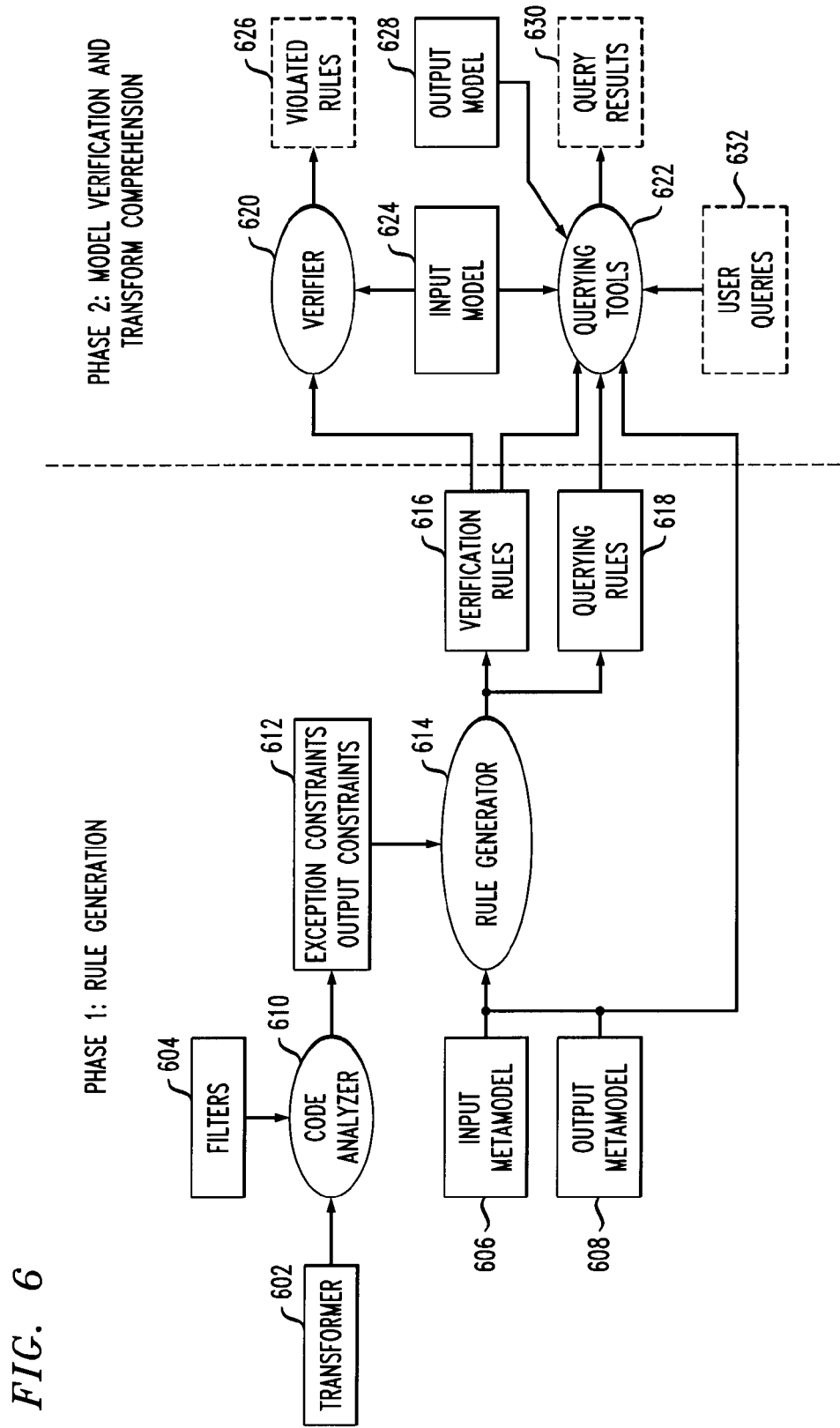
FIG. 6 is a block diagram illustrating an exemplary embodiment, according to an aspect of the invention.

FIG. 6 is a block diagram illustrating an exemplary embodiment, according to an aspect of the invention. By way of illustration, FIG. 6 illustrates a rule generation phase (that is, Phase 1). As such, FIG. 6 depicts a transformer 602 and filters 604 that provide input to a code analyzer 610, which generates exception constraints and output constraints 612. The constraints 612 are provided to a rule generator 614 along with an input meta-model 606 and an output meta-model 608. The rule generator 614 generates verification rules 616 and querying rules 618.

FIG. 6 also illustrates a model verification and transform comprehension phase (that is, Phase 2). As such, the verification rules 616, querying rules 618, input model 624, output model 628, user queries 632, input meta-model 606 and output meta-model 608 are provided to a querying tool 622. The input model 624 also provides input to a verifier 620, which determines violated rules 626. The querying tool 622 generates query results 630.

FIG. 6 depicts an overview of one or more embodiments of the invention, which includes two phases: (1) rule generation, and (2) model verification and transform comprehension. The first phase generates the transformation rules in two steps. In the first step, the approach analyzes the transformer code to compute exception and output constraints. The computed constraints include conditions on transformer inputs that cause the transformer to terminate with a run-time exception or generate an incomplete output model. The code analyzer also takes, as an input, user-provided filter specifications that it uses to remove some of the computed constraints that are uninteresting from the user's perspective. For example, some of the constraints are filtered because the transformer-authoring framework enforces certain input conditions, which the code analyzer is unaware of. Therefore, the analyzer can compute constraints that cannot be true in that specific framework, although they could be true in a different authoring framework.

The information generated during the first step is at a low level of abstraction: the constraints are stated in terms of program variables. To support verification and comprehension, these constraints need to be stated at a higher level of abstraction. Thus, the second step of Phase 1 translates the constraints to state them in terms of input and output meta-model elements. Exception constraints are translated to verification rules, whereas output constraints are converted to querying rules.

Phase 2 supports model verification and transform comprehension using the rules inferred in the first phase. The verification rules inferred in Phase 1 can be used to construct a verifier that, given an input model, identifies the rules that are satisfied by the model. The verifier can also be used in an interactive mode to guide the user in the task of creating an input model. Thus, in this mode, the user avoids creating an invalid input model to begin with, instead of first creating the model and then running it through the verifier. The querying rules can be used to help the user understand why certain output model elements are not generated in an execution of a transformer.

To compute constraints, one or more embodiments of the invention can include leveraging the null-dereference analysis, by way of example, implemented in a tool called XYLEM. The XYLEM analysis identifies a program path along which a dereference at a given statement can be null. Starting at a statement sr that dereferences variable v, XYLEM performs a backward, path-sensitive and context-sensitive analysis to identify such a path. During the analysis, a set of abstract state predicates is propagated backward in the control-flow graph (CFG). The analysis starts with a predicate asserting that v is null, and updates states during the path traversal. If the updated state becomes inconsistent, the path is infeasible and the analysis stops traversing the path. The algorithm returns after identifying a feasible path.

In one or more embodiments of the invention, the XYLEM analysis is modified and extended in several ways. For example, the predicates can be extended from the standard nullary, unary and binary predicates to include multi-variable predicates that include function calls and all the related parameters in the access path. Also, in addition to identifying null-pointer exceptions, the extended analysis identifies potential class-cast and (limited forms of) array-index exceptions, and instead of identifying one feasible path (to a null dereference), the analysis can identify constraints on input variables along all paths.

As detailed herein, one or more embodiments of the invention include path-sensitive analysis for computing constraints on inputs. As such, definitions that formalize the constraints on input variables computed by the algorithm can include, for example, the following. The analysis propagates a set of abstract state predicates backward in the program:

DEFINITION 5: (Abstract state) An abstract predicate $\gamma$ is a predicate of the form shown in FIG. 7. An abstract state r is a conjunction of abstract predicates. FIG. 7 is a diagram illustrating abstract predicates tracked by analysis 702, according to an embodiment of the invention. type (v) returns the type of a reference variable v. T is a set of types.

FIG. 7 depicts three types of predicates on reference variables (predicates 1-3), a predicate on Boolean variables (predicate 4), and two types of predicates on integer variables (predicates 5 and 6). One or more embodiments of the invention include two additional predicates, one on types of variables (predicate 7) and another on sizes of collection objects (predicate 8). Also, one or more embodiments of the invention can include using a modified rule for an access path, the grammar rule labeled 9 in FIG. 7.

DEFINITION 6: (Code access path) A code access path is a sequence of dereferences $v_1.v_2\ldots.v_k$, $k\geq 1$, where $v_i$, $1\leq i<k$, is a reference variable or a method that returns a reference type, and $v_k$ is a method, a reference, an integer, or a Boolean variable. For $v_i=m(x_1, \ldots, x_j), j\geq 0$, each $x_i$ is a code access path.

Rule 9 (as depicted in FIG. 7) allows method names to appear, with arbitrary nesting, in an access path. Such method names represent calls to external methods (that is, methods that are not part of the transformer being analyzed). An example of such an access path can include:

(getObjectByType(getEditingDomain( ).getResource Set( ).

getResource(createURI("pathmap://url"),1).getContents( ),

UMLPackage.PACKAGE).getOwnedElements( ).get( )==null).

DEFINITION 7: (Path constraint) Let $\rho=(s_1, \ldots, s_k)$, $k\geq 2$ be a program path (a sequence of statements) from the entry statement of the program to statement s. Let γ be an abstract predicate on a variable used at $s_k$. The path constraint $C(\rho, \gamma)$ is the state $\Gamma_p$ at $s_1$ such that if the predicates in $\Gamma_p$ are true, γ is true at $s_k$.

In many cases, a path constraint with respect to a predicate and a statement is a sufficient condition for the predicate to be true at the statement. However, this is not true in general because of limitations of static analysis.

DEFINITION 8: (Input constraint) Let paths(s) be the set of paths from the entry statement of a transform program to statement s. Let $I=\{i_1, \ldots, i_k\}$, $k\geq 1$, be the set of input variables to the program. Let γ be an abstract predicate on a variable used at s. The input constraint $C_1(\gamma, s)$ is the disjunction $V_{p\in path(s)}\Gamma_p[I]$, where $\Gamma_p[I]$ contains the predicates in $\Gamma_p$ with respect to the variables in I.

The input constraint can be a formula in the Disjunctive Normal Form (DNF), where each disjunct represents the constraint (on input variables) along one program path from the entry to the given statement s.

FIG. 8 is a diagram illustrating analysis (for example, the XYLEM analysis) 802 used to compute constraints on input variables under which the given predicate γ evaluates true at the given statement s, according to an embodiment of the invention. FIG. 8 depicts procedure ComputeConstraints, which performs the path-sensitive and flow-sensitive XYLEM analysis. ComputeConstraints is a recursive procedure that, given an input abstract predicate and an input statement s, computes the constraints on input variables under which evaluates to true at s.

The procedure uses a standard worklist-based approach to compute a fix-point solution over the state predicates (lines 2-16). Each element of the worklist is a pair including a statement and a state. The procedure initializes the state to γ and adds (s, Γ) to the worklist (line 2). Then, it iteratively removes an element (s, Γ) from the worklist processes each predecessor of s. If a predecessor is neither the entry node of the method nor a call node, the procedure computes the state transformation induced by sp, checks whether the updated state is consistent, and updates the worklist (lines 5-8).

As detailed herein, one or more embodiments of the invention include interprocedural path exploration. FIG. 9 is a table 902 illustrating state transformations at statements, according to an embodiment of the invention. F represents the state following a statement, and Γ' represents the state preceding a statement. FIG. 9 depicts the state transformations that occur at some of the statements. The notation Γ[x/y] represents the state with each syntactic occurrence of variable x replaced with y. Consider the state transformation at statement x=r.f. The updated state contains the predicates in the incoming state, with each predicate on x replaced with a predicate on r.f, and predicate <≠null>. At the call to an application method, x=r.m( ), the updated state includes <≠null> and the transformation induced on Γ by r.m( ). Function σ computes the transformation of the given state by the given method.

In one or more embodiments of the invention, extensions to the original XYLEM analysis include modifications to some of the state transformations 5-8 (highlighted with an asterisk). Transformations 5-7 are related to the analysis of class-cast exceptions. Transformation 8 is related to the extension to rule 8 in FIG. 7. At a statement x=m( ) that calls an external method, the incoming state is updated by replacing occurrences of x with the expression for the method call. This lets the analysis identify conditions involving external method calls, where the parameters of the method have dependences on input variables.

To perform efficient analysis of called methods, the procedure uses summary information at call sites. The summary information at a call site maps an incoming state Γ to an outgoing state Γ' to which the called method transforms Γ. Using the summary information, the procedure avoids analyzing a method multiple times for the same state. On reaching a call site, the procedure first checks whether summary information exists for the current state (lines 9-11). If no summary exists, the algorithm descends into the called methods to analyze them (lines 12-14). It uses a call stack to ensure context-sensitive processing of called methods. After returning from the called method, the analysis saves the summary information for reuse in subsequent traversals (line 15).

On reaching the entry of the method that is not being analyzed in a specific context (line 17), the algorithm ascends to all call sites that call the method (lines 20-21). If the entry of the transform is reached, the algorithm adds the state predicates as a disjunct to the input constraints (lines 18-19).

Example 1

Consider the XYLEM analysis, starting at line 9 with γ=<type_src=null>, for the transformer code shown in FIG. 5. On traversing the condition at line 8, the analysis adds predicates <attr.isIsSimple( )=true> <attr≠null> to the state. At this point, the state contains three predicates. Statement 7 transforms predicate <type_src=null> to <attr.getType( )=null>. When the analysis reaches the assignment to attr in line 1, it has found a constraint on input variable source:

(source≠null)∧

(source.isIsSimple( )=true)∧

(source.getType( )=null).

As detailed herein, one or more embodiments of the invention include computation of exception and output constraints. FIG. 10 is a diagram illustrating analysis 1002 (for example, algorithm TransformerAnalysis) for computing exception and output constraints for a transformer, according to an embodiment of the invention. An exception constraint can be defined more formally as follows:

DEFINITION 9: (Exception constraint) An exception constraint is a constraint $C_{I(ex)}(\gamma, s)$, where γ represents the condition under which a runtime exception can occur at s in some execution of the program.

For example, if statement s dereferences variable v, γ=<v=null>, and $C_{I(ex)}(\gamma, s)$ represents the conditions on input variables under which a null-pointer exception can be thrown at s. One or more embodiments of the invention can, for example, include handling Java null-pointer exceptions, class-cast exceptions, and array-index exceptions.

With respect to null-pointer exceptions, to compute exception constraints for potential null-pointer exceptions, TransformerAnalysis processes each statement in the transformer that dereferences a variable to check whether a null-pointer exception could occur at that statement (lines 1-4). For a dereference of variable v at statement s, the algorithm initializes γ to <x=null>, and then it calls a procedure ComputeConstraints, which computes the conditions on input variables under which γ evaluates to true at s.

To identify class-cast exceptions, the algorithm keeps track of abstract predicates on types of reference variables. For a reference variable v, predicate <type(v)∈T> asserts that v points to an instance of one of the types in the set T; the negation of this predicate, <type(x) T> asserts that the type of v is not in the set T.

Similar to null-dereference analysis, the algorithm (as depicted in FIG. 10) starts at a statement s where a class-cast exception could be raised, and initializes the state with a predicate that asserts the condition under which the exception occurs at the statement. For a typecast statement x=(T)y, γ is initialized to <type(y) ∋ (subtypes(T) ∪ null))> (line 6), which states that y is neither null nor of a type that can be cast to T. Then, the algorithm calls analyzeMethod to get back input constraints under which γ is true at s (lines 7-8).

State transformations 5-7 depicted in FIG. 9 can be relevant for the analysis of class-cast exceptions. For example, transformation 7 (that occurs at a statement x instance of 7) adds two predicates to the incoming state Γ: the first predicate asserts that x cannot be null because, in the Java semantics, a null is not an instance of any type; the second predicate constrains the type of x to be a subtype of T. Transformation 6 is similar, but it does not add <≠null> to the state because, in Java, a null can be cast to any type.

Given two type predicates on a variable v, they are resolved as follows: $<type(s) \in T_1> \wedge <type(s) \in T_2 = T_1 \cap T_2$, if $(T_1 \cap T_2) \neq \emptyset$.

Example 2

Consider the example program fragment shown below. To determine whether a class-cast exception can occur at line 3, the analysis initializes the state with predicates <α≠null> and <type(a)∈{A21}>. Statement 2 generates the predicates <a≠null> and <type(a)∈{A2,A21,A22}>. The resolved set of predicates now includes $\gamma_1$=<a 6=null> and $\gamma_2$=<type(a)∈{A2,A22}>. Then, statement 1 generates predicate <type(a)∈{A1}>, which is inconsistent with $\gamma_2$. Therefore, the path (1, 2, 3) is infeasible and, consequently, no class-cast exception can occur at line 3.

public class A { }
public class A1 extends A { }
public class A2 extends A { }
public class A21 extends A2 { }
public class A22 extends A2 { }
...
[1] A a=new A1( );
[2] if (a instance of A2)
[3] A21 a21=(A21)a.

With respect to array-index exceptions, a limited analysis of statements can be performed, such as statement 20 in the INFOTRANS code (as depicted in FIG. 5), that retrieve a value from a collection using an integer constant as the index value. At such a statement s: c.get(intConst), if the size of collection c is less than or equal to intConst, an array-index exception is thrown. In one or more embodiments of the invention, extensions perform a simple analysis by computing the conditions on input variables under which (1) s is reached with c≠null, and (2) and there is no condition statement, on which s is directly or indirectly control dependent, that checks the size of c.

TransformerAnalysis iterates over the statements that retrieve an element from a collection using a constant index (line 7). For each such statement s: c.get(intConst), the algorithm calls ComputeConstraints with predicates <c≠null> and <c.size≦intConst>(lines 8-9). If there is no check on c.size (line 10), the algorithm adds the generated constraints to $C_{I(ex)}$ (line 11). Otherwise, the algorithm assumes that no array-index exception can occur at s and ignores the computed constraints.

Note that although the algorithm adds a predicate of the form v.size≦intConst to the initial state, it does not analyze how v.size is actually updated in the program, for example, by statements that add elements to the collection. Thus, for array-index exceptions, the analysis computes constraints that assert that the c.get(intConst) statement is reached (with no check on c.size) and that the size of c is less than or equal to intConst. It does not compute the actual conditions under which c≦intConst.

Example 3

For the call to get( ) at statement 20 in FIG. 5, the analysis calls ComputeConstraints with the initial state containing only $\gamma_1$=<attr.getAnnotations( ).size≦0>. It does not add a null predicate on attr.getAnnotations( ) to the state because a filtering rule states that getAnnotations( ) does not return null. At statement 18, it picks up predicate $\gamma_2$=<attr.isIsSimple( )≠true>. Statement 17 updates both the predicates by replacing attr with attrItr.next( ). Next, at statement 16, analysis does not add a predicate for the loop condition. At the entry of handleComplexTypes( ), the analysis ascends to the call site at line 30 of execute2( ). Using the actual-to-formal parameter matching, it updates the state predicates by replacing attrItr with artifact.-getAttributes( ). Thus, at this point $\gamma_1$ is:

artifact.getAttributes( ).next( ).
getAnnotations( ).size≦0.

Continuing in the same manner through statements 28, 27, 26, and 24, the analysis computes $\gamma_1$ at entry as:

source.getArtifacts( ).next( ).getAttributes( ).
next( ).getAnnotations( ).size≦0.

Predicate $\gamma_2$ is updated similarly.

FIG. 11 is a table 1102 illustrating exception and output constraints and the corresponding transform rules inferred for the three exceptions and output statement in the INFOTRANS code fragment depicted in FIG. 5, according to an embodiment of the invention. The first constraint causes two transform rules to be generated, whereas the other constraints result in one rule each. The "*" in the exception constraints represents ".next( )."

With respect to output constraints, an output constraint can be formally defined as follows:
DEFINITION 10: (Output constraint) Let v be an output variable of a transform Γ. Let se be the exit statement of Γ. Let rdefs($s_e$, v) be the reaching definitions of v. An output constraint $C_{out}$ (v) is the disjunction $V_{d \in rdefs(v)} = C_1 \gamma_d, s_{cd})$, where d is control dependent on ($s_{cd}$, L) and $\gamma_{cd}$ is the predicate asserting that the condition at $s_{cd}$ evaluates to 'L', where L is either true or false.

Intuitively, an output constraint captures the conditions on input variables under which an output element is generated. Lines 13-17 of TransformAnalysis (depicted in FIG. 10) illustrate the computation of output constraints. The algorithm iterates through each output variable v (line 13) and each reaching definition, at the exit of the transform, of v (line 14). For each reaching definition d, the algorithm examines the statement $s_{cd}$ on which d is control dependent (line 15). It then initializes γ to a predicate asserting that the condition at $s_{cd}$ evaluates such that d is reached (line 16), and calls Compute-Constraints to identify the input conditions under which γ evaluates to true (line 17).

Example 4

Consider statement 12 in the INFOTRANS code fragment (as depicted in FIG. 5), which defines the property type in the target object. For the output variable corresponding to property type, statement 12 is one of the reaching definitions. The analysis starts at the control dependence of this statement—statement 11—with a predicate <ptype≠null>. At statement 10, ptype is replaced with the external method call to UMLUtilities.findType( . . . ). Next, the analysis picks up predicate <type_src.equals("String")=true> at statement 9 and <attr.isIsSimple( )=true> at statement 8. After processing the assignments at statements 7 and 1 (as discussed in Example 1), the analysis identifies the following conditions at the entry of the method:

(source.isIsSimple( )=true)∧
(source.getType( ).equals("String")=true)∧
(UMLUtilities.findType( . . . )≠null).

The third conjunct is not related to an input variable and is, therefore, excluded from the constraints output by the analysis.

After computing the constraints, TransformerAnalysis performs post-processing (line 17) to remove predicates that do not involve input variables. Such predicates are of the form in which the code access path ends at an external method call, such that the actual parameters of the call are not dependent on transformer inputs (as illustrated in Example 4).

With respect to constraint filters, one or more embodiments of the invention include using filters to improve the results computed by the tool described herein. These filters exclude certain predicates that are uninteresting from the transformer user's perspective. One or more embodiments of the invention can include dividing the filters into two categories: "invalid constraints" and "bug constraints."

The first category filters predicates that cannot be true because of constraints imposed by the transformer authoring framework. This category of filter prevents false predicates from being added to the state during the analysis. For example, if eclipse modeling framework (EMF) were used to serialize the input model file into a Java object, any list accessed from such objects and corresponding iterators cannot be null. Thus, at a dereference list.f of such a list, predicate <list≠null> need not be generated. For example, in INFOTRANS, the call to attr.getAnnotations( ) at line 20 returns an EMF EList, which cannot be null. Therefore, the analysis does not add predicate <attr.getAnnotations( )≠null> to the state at that statement (as mentioned earlier in Example 3). By way of example, the use of only a few such filters can improve the results of the analysis by removing many false predicates.

The second category filters out constraints that indicate potential bugs in the transformer code. Such constraints, although relevant for the transformer author, are uninteresting from the transformer user's perspective. In fact, in a scenario where the transformer author uses the approach to compute constraints, the author could either fix the potential bugs or filter out the constraints before computing the transform rules.

As noted, the techniques described herein include rule generation. The second step of Phase 1 (as depicted in FIG. 6) converts code-level constraints to model-level rules.

DEFINITION 11: (Rule predicate) A rule predicate ψ, defined with respect to an access path in a meta-model M, is a predicate of the form shown in FIG. 12.

FIG. 12 is a diagram illustrating rule predicates defined with respect to meta-model access paths 1202 and transform rules defined with respect to a pair of input and output meta-models 1204, according to an embodiment of the invention.

A rule predicate is defined in terms of a meta-model access path, and specifies constraints on the path. For example, for the INFOTRANS, DataModel.artifacts.attributes.type=null is a rule predicate. A transform rule is defined over a conjunction of rule predicates.

DEFINITION 12: (Transform rule) A transform rule defined with respect to a transformer $\Gamma: M_I \rightarrow M_O$ is a rule, of the form shown in FIG. 12. The left-hand side (the antecedent) is a conjunction of rule predicates. The right-hand side (the consequent), which states the result of the rule, is either an exception or the creation of an output meta-model element or property (defined as an access path).

FIG. 13 is a diagram illustrating a mapping file 1302 used for translating the INFOTRANS exception and output constraints to transform rules, according to an embodiment of the invention.

As detailed herein, FIG. 11 depicts the transform rules generated for the three exception constraints and one output constraint for INFOTRANS. For example, the first rule states that if the isSimple property of DataModel.artifacts.attributes is true and the type property is null, a null-pointer exception occurs in the transformer.

Note that whereas a code constraint is a DNF formula (a disjunction of conjunctions) over abstract predicates, a transform rule is a conjunction of rule predicates. The rule generator translates each conjunct (or, a path constraint) in a code-level input constraint to a transform rule. Thus, an input constraint with n path constraints leads to the generation of n transform rules. Rules can be defined as a conjunction instead of a DNF formula because that enables the identification and elimination of duplicate rules. For example, an exception constraint may cause null-pointer exceptions at several statements in the transformer. The code analysis will compute the same constraint for each of these statements. Consequently, the rule set will have multiple rules that have the same antecedent and consequent (null-pointer exception); such duplicate rules are removed during rule generation.

Moreover, such a representation is natural because a rule provides a top-down view as opposed to a bottom-up view provided by code constraints. For an exception or an output statement, a code constraint shows different alternative input conditions that can cause the exception to be raised or the output to be generated, respectively (a bottom-up view). A transform rule, in contrast, shows different alternative results (exception or output generation) that can occur for a particular conjunction of input conditions (a top-down view).

The constraint-to-rule translation requires converting an abstract predicate γ to a rule predicate ψ, which, in turn, essentially involves converting a code access path $\Pi_{code}$ to a meta-model access path $\Pi_{model}$. Thus, the core of the rule generator component is the access-path translation step. Recall from Definitions 6 and 2 that $\Pi_{code}$ is a sequence of dereferences of variables or method return values, whereas $\Pi_{model}$ is a sequence of containment relations that is composed of meta-model element names and possibly ending with a property. For each reference variable v or method m( )

in $\Pi_{code}$, the rule generator has to identify the meta-model access path to replace v or m( ).

For example, consider the first exception constraint and its corresponding transform rule in FIG. 11. To perform the translation, the rule generator has to replace variable source with meta-model access path DataModel.artifacts.attributes, method isIsSimple( ) with property isSimple, and method getType( ) with property type.

To do the translation, one or more embodiments of the invention include using a mapping file. FIG. 13, as detailed herein, depicts a partial XML representation of the mapping information for INFOTRANS. A mapping file can link meta-model element names and properties to entities in the transformer inputs. For INFOTRANS, this requires linking the input ECORE meta-model element names and properties to Java methods and fields.

In the representation depicted in FIG. 13, each meta-ModelElement entry maps a meta-model element name or property type to Java method names. For example, property isSimple maps to method isIsSimple( ) in the input Java class. Similarly, the element type named artifacts maps to method getArtifacts( ). Each methodName entry in the file states the meta-model access paths for the inputs and outputs of a "main" method in the transformer—a method that is invoked to perform a transformation. In the Rational Software Architect (RSA) transformation authoring framework, a transformer can have multiple main methods; this may not be true for other frameworks.

For example, method execute1( ) takes as input a Java class that corresponds to the meta-model access path DataModel.artifacts.attributes or the path DataModel.contextArtifacts.attributes. Its output Java class corresponds to the access path Model.classes.properties in the output UML meta-model. Note that an input or output class can correspond to more than one access paths. Similarly, for method execute2( ) the input Java class maps to access path DataModel, whereas the output class maps to access path Model.

Using this mapping information, the rule generator can perform the constraint-to-rule translation by mapping code access paths to meta-model access paths.

Example 5

Consider the constraints and transform rules depicted in FIG. 11. For the code access path of the first exception constraint, the rule generator creates two meta-model access paths, and, therefore, two transform rules. It replaces source (the input Java class name of execute1( )) with DataModel.artifacts.attributes in the first rule, and Data-Model.contextArtifacts.attributes in the second rule. Also, the rule generator replaces method name isIsSimple( ) with property isSimple in the first rule, and getType( ) with property type in the second rule. Thus, the exception constraint for the null-pointer exception is translated to two transform rules.

Example 6

Consider the access path for the predicate on types in the second constraint in FIG. 11. For this constraint, the relevant entry method is execute2( ). Therefore, using the parameter-mapping information for execute2( ) the rule generator translates source to DataModel. Also, using the third mapping rule in FIG. 13, the rule generator replaces getArtifacts.* with artifacts. In general, an access of an element in a collection (for example, c.next( )) in $\Pi_{code}$ corresponds to a meta-model element with cardinality 'many' in $\Pi_{model}$.

Similarly, the generator translates getAttributes( ).* and getAnnotations.*. Further, the generator replaces get(0) with 0 to compute the translated meta-model access path. In general, the rule generator replaces a method that retrieves a collection element using a constant index with the constant index value in the meta-model access path.

The extent to which the generation of the mapping file can be automated depends on the transformation authoring framework and the representation of the input and output models that are being used. For example, if the models are represented using EMF, the mapping of meta-model elements to methods can be generated automatically, with no manual intervention by the user. However, in other standard or custom model-transformation frameworks, less automation may be possible, which would require the transformer author to provide the information manually. Similarly, in the RSA framework, the information about method to source/target mapping can be generated automatically. In other frameworks, such automation may not be possible.

As also described herein, one or more embodiments of the invention include model verification and transform comprehension. The transform rules inferred in Phase 1 can be used to support model verification and transform comprehension. Because the rules are stated in the meta-model vocabulary, they can be used in a straight-forward manner to support these tasks.

One or more embodiments of the invention include distinguishing verification rules from querying rules. In a verification rule, the consequent is an exception that can be thrown if the antecedent is satisfied. In a querying rule, the consequent is an existential quantifier on an output meta-model access path. Such a rule states that if the antecedent is satisfied, an element or property is created in the output model. The verification rules are used for checking whether a model is a valid input to a transformer, whereas querying rules are used for supporting general transform comprehension. Both of these use cases are illustrated herein.

With respect to model verification, given a set of verification rules $\psi$ for a transformer $\Gamma: M_I \rightarrow M_O$ and an input model $M_I$, a verifier returns a subset of the rules in $\psi$ that are satisfied by $M_I$. If none of the rules are satisfied, $M_I$ is a valid instance that the transformer can be executed on. However, if at least one of the verification rules is satisfied, $M_I$ is not a valid input to the transformer, and the transformer can fail with an exception when executed on $M_I$. To check whether a rule $\psi \in \Psi$ is satisfied by $M_I$, the verifier finds the matching instances for the meta-model access path in the antecedent of $\psi$, and applies the condition stated in the antecedent rule predicate to the instances. If the condition is satisfied, $M_I$ is an invalid input model to $\Gamma$.

The verifier can be used in a batch mode in which it gives a list of matching rules and corresponding problematic input model elements. Alternatively, the verifier can be used in an interactive mode. In this mode, while the user is creating an input model, the verifier flags the problematic input model elements that could cause exceptions.

With respect to transform comprehension, a querying rule can be used to support user queries in a comprehension tool. For example, if an element that was expected in the output model is missing, the querying rules can be searched to find the ones that determine the creation of the missing element in the output model. These rules indicate the dependences of the missing output element to the input model elements. The user can then identify the cause by examining the input model elements to see whether they satisfy the rules, and correct the input model appropriately.

In general, static analysis cannot compute sufficient conditions for a statement to be reached, because of the presence of loops. Thus, a path constraint with respect to a path $\rho = (s_1, \ldots, s_k)$ and a predicate is not a sufficient condition for $\gamma$ to be true at $s_k$. However, model transformers are a very restricted class of Java programs. Transformers typically contain little or no business logic. Much of the code is devoted to composing output model elements from input model elements, based on different conditions. Because of the limited ways in which transformers are coded, static analysis can attain far greater success in computing sufficient conditions for this class of programs than it might achieve for applications coded in less restricted ways.

Another factor that affects the sufficiency of a constraint computed by one or more embodiments of the invention can include that the constraint is stated in terms of input variables only. Predicates on calls to external methods are removed from the constraints, as illustrated in Example 4. Such predicates can affect whether the resulting constraint is sufficient for an exception to occur or an output element to be generated.

Although not sufficient, a path constraint is a necessary condition—if the constraint does not hold at $s_1$, $\gamma$ is definitely not true at $s_k$. An input constraint is a disjunction of path constraints. For an input constraint to be a necessary condition, the path constraint for each path must be computed. The presence of loops again makes this an unattainable goal.

Although a constraint may not be a sufficient condition, many conditions on input models can include bugs that the user would want to fix. Even though a condition may not be a sufficient condition for a failure to occur, it does highlight problems in the input model that the user would want to address.

In one or more embodiments of the invention, some steps of the approach can incorporate user inputs such as, for example, filters for the code analyzer and mapping information for the rule generator. For analysis filters, the use of only a few framework-specific filters can significantly reduce uninteresting constraints that provide no value. Moreover, the filters need to be specified only once, and can be identified with limited effort. For rule generation, depending on the framework being used, some mapping information can be provided manually, but such information needs to be provided once and, in many cases, can be auto-generated. The verification and querying steps can be automated, and thus, overall, the techniques described herein achieve significant automation and offer a solution that can assist users in diagnosing efficiently the causes of failing or incomplete transformations.

As detailed herein, in one or more embodiments of the invention, use of filters is advantageous because it can remove many uninteresting constraints. By doing so, it improves the effectiveness of model verification and transform comprehension. Moreover, many of the verification rules can be duplicates. Thus, removal of duplicate rules is a useful step that is essential for improving usability of the techniques detailed herein. As further described herein, transform rules can enable a user to identify the cause of a failing transformation or an incomplete output model more efficiently.

Figure 14:
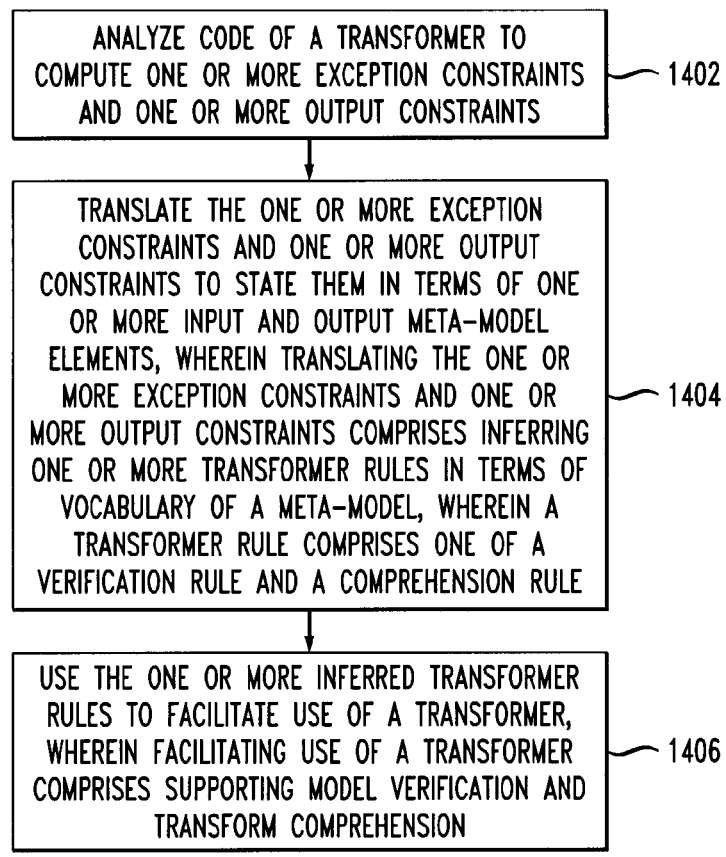
FIG. 14 is a flow diagram illustrating techniques for facilitating use of a transformer, according to an embodiment of the invention.

FIG. 14 is a flow diagram illustrating techniques for facilitating use of a transformer, according to an embodiment of the present invention. Step 1402 includes analyzing code of a transformer to compute one or more exception constraints and one or more output constraints (for example, under which an execution of the transformer will fail with an exception). The transformer transforms one or more instances of a given input meta-model to one or more instances of a given output meta-model. The computed constraints can include one or more conditions on transformer inputs that cause the transformer to terminate with a run-time exception and/or generate an incomplete output model.

Analyzing code can additionally include receiving, as an input, user-provided filter specifications, wherein the user-provided filter specifications enable removal of one or more computed constraints (for example, as specified by the user). (For example, some of the constraints can be filtered because the transformer-authoring framework enforces certain input conditions, which the code analyzer is unaware of. Therefore, the analyzer can compute constraints that cannot be true in that specific framework, although they could be true in a different authoring framework. The code analyzer additionally supports inter-procedural analysis, can analyze incomplete transform modules (that is, missing libraries), enables a user to specify hotspots in code (package names, functions, etc.) to start the analysis from, and enables a user to specify hotspots in code to not start the analysis from.

Step 1404 includes translating the one or more exception constraints and one or more output constraints to state them in terms of one or more input and output meta-model elements, wherein translating the one or more exception constraints and one or more output constraints comprises inferring one or more transformer rules in terms of vocabulary of a meta-model (for example, using static program analysis), wherein a transformer rule comprises one of a verification rule and a comprehension rule. A transformer rule is specified as a logical implication, in which an antecedent is conjunction over a meta-model access path, wherein the meta-model access path is a sequence of meta-model element types such that for any pair (E1, E2) of consecutive element types, E1 and E2 are related, and such that the last element of the path is either an element type or a property. Additionally, method calls can also occur in the rules. Further, for a verification rule, the consequent is a run-time exception or error, such as a null-pointer exception, a class-cast exception, or an array-index exception. For a comprehension rule, the consequent is an output model element.

A meta-model includes a set of element types (one of which is the unique root element type), a set of relation types, and a set of properties. A verification rule is a condition on an input meta-model under which the transformer fails with a run-time exception. Examples can include null-pointer exceptions and class-cast exceptions, array index out-of-bounds exceptions, etc. A comprehension rule is a condition on an input meta-model under which an output model element is generated. Also, in one or more embodiments of the invention, an exception constraint can be translated to a verification rule and an output constraint can be translated to a querying rule.

Step 1406 includes using the one or more inferred transformer rules to facilitate use of a transformer, wherein facilitating use of a transformer comprises supporting model verification and transform comprehension. One or more inferred verification rules can be used to construct a verifier that, given an input model, identifies one or more rules that are satisfied by the meta-model. Additionally, using the inferred transformer rules to facilitate use of a transformer can include making a determination of which of the constraints on an input model under which an execution of the transformer will fail with an exception to identify one or more model elements that cause failure.

The techniques depicted in FIG. 14 can also include enabling construction of a query and return of one or more rules that match the query and one or more model instances that match the one or more rules. Additionally, one or more embodiments of the invention include enabling execution of one or more queries on the output model (or meta-model) to identify conditions under which an output model element is produced and identifying missing input model elements if an output is not getting produced.

Further, the techniques depicted in FIG. 14 can include auto-correcting (or suggesting) one or more modifications to an input model based on inferred rules, as well as facilitating creation (for example, by a user) of an input model to ensure that the created model violates no verification rule. As such, in this mode, the user avoids creating an invalid input model to begin with, instead of first creating the model and then running it through the verifier. The querying rules can also be used to help the user understand why certain output model elements are not generated in an execution of a transformer.

The techniques depicted in FIG. 14 can also, as described herein, include providing a system, wherein the system includes distinct software modules, each of the distinct software modules being embodied on a tangible computer-readable recordable storage medium. The distinct software modules can include, for example, a verifier module, a code analyzer module, a rule generator module and a querying tool module executing on a hardware processor.

Additionally, the techniques depicted in FIG. 14 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 15:
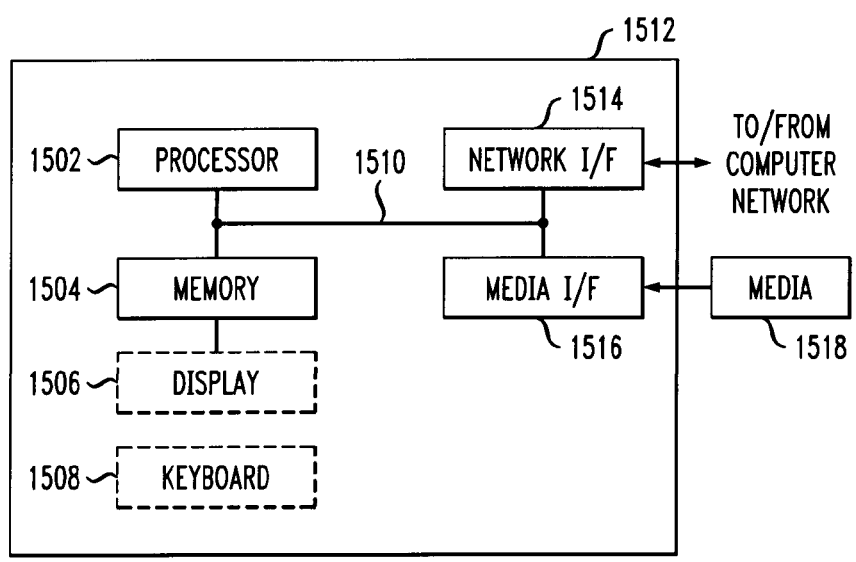
FIG. 15 is a system diagram of an exemplary computer system on which at least one embodiment of the invention can be implemented.

One or more embodiments can make use of software running on a general purpose computer or workstation. With reference to FIG. 15, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1502, memory 1504, and input/output interface such as display 1506 and keyboard 1508 can be interconnected, for example, via bus 1510 as part of a data processing unit 1512. Suitable interconnections, for example via bus 1510, can also be provided to a network interface 1514, such as a network card, which can be provided to interface with a computer network, and to a media interface 1516, such as a diskette or CD-ROM drive, which can be provided to interface with media 1518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1502 coupled directly or indirectly to memory elements 1504 through a system bus 1510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1512 as shown in FIG. 15) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 6. The method steps can then be carried out using the distinct software modules and/or sub-modules of the system, as described above, executing on one or more hardware processors 1502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, automatically diagnosing failures or exceptions, as well as identifying usage conditions of a model transformation.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer-implemented method for facilitating use of a transformer, wherein the method comprises:
   analyzing code of a transformer to compute one or more exception constraints and one or more output constraints;
   translating the one or more exception constraints and one or more output constraints to state them in terms of one or more input and output meta-model elements, wherein translating the one or more exception constraints and one or more output constraints comprises inferring one or more transformer rules in terms of vocabulary of a meta-model, wherein a transformer rule comprises one of a verification rule and a comprehension rule; and
   using the one or more inferred transformer rules to facilitate use of a transformer, wherein facilitating use of a transformer comprises supporting model verification and transform comprehension.

2. The computer-implemented method of claim 1, wherein the transformer transforms one or more instances of a given input meta-model to one or more instances of a given output meta-model.

3. The computer-implemented method of claim 1, wherein the one or more computed constraints comprise one or more conditions on transformer inputs that cause the transformer to at least one of terminate with a run-time exception or generate an incomplete output model.

4. The computer-implemented method of claim 1, wherein analyzing code further comprises receiving, as an input, one or more user-provided filter specifications, and wherein the one or more user-provided filter specifications enable removal of one or more computed constraints.

5. The computer-implemented method of claim 1, wherein a transformer rule is specified as a logical implication, in which an antecedent is conjunction over a meta-model access path, wherein the meta-model access path is a sequence of one or more meta-model element types such that for any pair (E1, E2) of consecutive element types, E1 and E2 are related, and such that a last element of the path is either an element type or a property.

6. The computer-implemented method of claim 1, wherein a meta-model comprises a set of one or more element types, a set of one or more relation types, and a set of one or more properties.

7. The computer-implemented method of claim 1, wherein a verification rule is a condition on an input meta-model under which the transformer fails with a run-time exception.

8. The computer-implemented method of claim 1, wherein a comprehension rule is a condition on an input meta-model under which an output model element is generated.

9. The computer-implemented method of claim 1, wherein an exception constraint is translated to a verification rule and an output constraint is translated to a querying rule.

10. The computer-implemented method of claim 1, wherein one or more inferred verification rules are used to construct a verifier that, given an input model, identifies one or more rules that are satisfied by the meta-model.

11. The computer-implemented method of claim 1, wherein using the one or more inferred transformer rules to facilitate use of a transformer comprises making a determination of which of the one or more constraints on an input model under which an execution of the transformer will fail with an exception to identify one or more model elements that cause failure.

12. The computer-implemented method of claim 1, further comprising enabling construction of a query and return of one or more rules that match the query and one or more model instances that match the one or more rules.

13. The computer-implemented method of claim 1, further comprising enabling execution of one or more queries on the output model to identify one or more conditions under which an output model element is produced and identifying one or more missing input model elements if an output is not getting produced.

14. The computer-implemented method of claim 1, further comprising auto-correcting one or more modifications to an input model based on one or more inferred rules.

15. The computer-implemented method of claim 1, further comprising facilitating creation of an input model to ensure that the created model violates no verification rule.

16. The computer-implemented method of claim 1, further comprising providing a system, wherein the system comprises one or more distinct software modules, each of the one or more distinct software modules being embodied on a non-transitory computer-readable recordable storage medium, and wherein the one or more distinct software modules comprise a verifier module, a code analyzer module, a rule generator module and a querying tool module executing on a hardware processor.

17. A computer program product comprising a non-transitory computer readable recordable storage medium including computer useable program code for facilitating use of a transformer, the computer program product including: computer useable program code for analyzing code of a transformer to compute one or more exception constraints and one or more output constraints; computer useable program code for translating the one or more exception constraints and one or more output constraints to state them in terms of one or more input and output meta-model elements, wherein translating the one or more exception constraints and one or more output constraints comprises inferring one or more transformer rules in terms of vocabulary of a meta-model, wherein a transformer rule comprises one of a verification rule and a comprehension rule; and computer useable program code for using the one or more inferred transformer rules to facilitate use of a transformer, wherein facilitating use of a transformer comprises supporting model verification and transform comprehension.

18. The computer program product of claim 17, wherein the computer useable program code for using the one or more inferred transformer rules to facilitate use of a transformer comprises computer useable program code for making a determination of which of the one or more constraints on an input model under which an execution of the transformer will fail with an exception to identify one or more model elements that cause failure.

19. A system for facilitating use of a transformer, comprising:
   a memory; and
   at least one processor coupled to the memory and operative to:
      analyze code of a transformer to compute one or more exception constraints and one or more output constraints;
      translate the one or more exception constraints and one or more output constraints to state them in terms of one or more input and output meta-model elements, wherein translating the one or more exception constraints and one or more output constraints comprises inferring one or more transformer rules in terms of vocabulary of a meta-model, wherein a transformer rule comprises one of a verification rule and a comprehension rule; and
      use the one or more inferred transformer rules to facilitate use of a transformer, wherein facilitating use of a transformer comprises supporting model verification and transform comprehension.

20. The system of claim 19, wherein the at least one processor coupled to the memory operative to use the one or more inferred transformer rules to facilitate use of a transformer is further operative to make a determination of which of the one or more constraints on an input model under which an execution of the transformer will fail with an exception to identify one or more model elements that cause failure.

* * * * *